(12) United States Patent
Jeong

(10) Patent No.: US 6,541,093 B1
(45) Date of Patent: Apr. 1, 2003

(54) OPTICAL RECORDING MEDIUM AND METHOD FOR FABRICATING THE SAME

(75) Inventor: Tae Hee Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/534,129

(22) Filed: Mar. 23, 2000

(30) Foreign Application Priority Data

Mar. 25, 1999 (KR) .............................................. 99-10314

(51) Int. Cl.$^7$ ............................ B32B 3/02; B32B 31/00; G11B 7/24

(52) U.S. Cl. ..................... 428/64.4; 428/64.1; 428/64.9; 369/275.3; 156/275.3

(58) Field of Search ............................... 428/64.4, 64.1, 428/64.9; 369/275.3; 156/275.3

(56) References Cited

U.S. PATENT DOCUMENTS 6,153,063 A * 11/2000 Yamada et al. ........ 204/192.22

* cited by examiner

*Primary Examiner*—Cynthia H. Kelly
*Assistant Examiner*—L Ferguson
(74) *Attorney, Agent, or Firm*—Birch, Stewart, Kolasch & Birch, LLP

(57) ABSTRACT

An optical recording medium and a method for fabricating the same are provided, which enable overwriting at high density. The optical recording medium including a dielectric layer, a recording layer, and a reflecting layer on a substrate, is characterized in that an interface layer is formed on either at least one of lower and upper surfaces of the recording layer or one surface of the lower and upper surfaces of the dielectric layer, adjacent to the recording layer, at a predetermined thickness. Thus, jitter bump can be minimized, so that overwriting cyclicity of overwrite jitter can be improved.

2 Claims, 4 Drawing Sheets

OPTICAL RECORDING MEDIUM AND METHOD FOR FABRICATING THE SAME

BACKGROUND OF THE INVENTION

1. Field of the Invention

The present invention relates to an optical recording medium, and more particularly, to an optical recording medium and a method for fabricating the same, which enable overwriting at high density.

2. Background of the Related Art

Generally, an optical recording method records and reproduces information in a non-contact mode. Therefore, problems regarding head crash that may occur in a magnetic recording method can be solved fundamentally. Also, as compared with the magnetic recording medium, the optical recording medium has advantages that it permits a disk to be exchanged with another one, it is portable, and it has a small track pitch, so that higher recording density can be achieved. In this respect, the optical recording medium has received much attention, and research and development on the optical recording medium have been progressed.

The optical disk technology trends to high density and high speed and thus more strict jitter margin is required.

An optical disk which is commercially used has four- to five-layered structure grown on a transparent polycarbonate substrate.

In case of a phase-change optical disk, overwriting is possible. Such a phase-change optical disk will be described with reference to FIG. 1. As shown in FIG. 1, the optical disk is fabricated in such a manner that a lower dielectric layer, an information recording layer, an upper dielectric layer, and a reflecting layer are sequentially formed on a substrate by sputtering process under high vacuum state, and a passivation layer is formed by spin-coating a UV curing resin. At this time, one more layer may additionally be formed to improve recording cyclicity.

However, the related art optical disk has several problems.

For a phase-change optical disk, the jitter value of a recorded signal during the initial stage of a direct overwrite (DOW) cycle is usually much larger than that during the initial writing. Data reading error can occur while the disk is running in the drive when the jitter of the media is over a critical limit. The origin of a jitter bump is closely related to the crystallization rate, which is initially not sufficiently fast to match the linear velocity of the disk. That is, in the case of 2 DOW cycles, some marks have an amorphous tail in the tailing edge, which induces increase of the jitter value. The mark which has a tail is in the crystalline matrix which has large grains, while the mark which has a sharp trailing edge is located in the crystalline matrix which has small grains. Jitter was reduced after 100 DOW cycles. In the case of 100 DOW cycles, the mark has a sharp tailing edge without a tail and the crystalline matrix is composed of large grains.

The origin of jitter increase during the initial DOW cycle is mark-tail remaining. Previous marks did not crystallize completely at the level of erasing laser power. The previous mark of the center zone in the track width remained as a tail, while that of the side zone was crystallized as large grains by the grain growth process. This phenomenon occurs because the crystallization rate is initially not sufficiently fast to match the linear velocity of the disk.

Therefore, a problem of the jitter bump should be solved.

SUMMARY OF THE INVENTION

Accordingly, the present invention is directed to an optical recording medium and a method for fabricating the same, that substantially obviate one or more of the problems due to limitations and disadvantages of the related art.

An object of the present invention is to provide an optical recording medium and a method for fabricating the same, in which a jitter bump, which is increased during an initial DOW cycle, is reduced.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical recording medium including at least one dielectric layer, at least one recording layer, and a reflecting layer on a substrate, is characterized in that an interface layer is formed on either at least one of lower and upper surfaces of the recording layer or one surface of the lower and upper surfaces of the dielectric layer, adjacent to the recording layer, at a predetermined thickness, wherein the interface layer is formed by reacting any one of the recording layer and the dielectric layer with any one of N, O and C ions.

In one preferred embodiment of the present invention, the interface layer formed on the recording layer has a thickness of 5 nm or below and the interface layer formed on the dielectric layer has a thickness of 10 nm or below. Further, the recording layer is composed of any one material selected among a GeSb—$Sb_2Te_3$ based material, a material in which one of Ag, Se, In and Co is added to the GeSb—$Sb_2Te_3$ based material at about 10 at % (atomic percent) or below, and an Ag—In—Sb—Te based material, while the dielectric layer is composed of any one material selected among ZnS—$SiO_2$, $SiO_2$, $(Zr_xCe_{1-x})O_{1-y}$, AlN, and $Al_2O_3$.

In another aspect, a method for fabricating an optical recording medium including at least one dielectric layer, at least one recording layer, and a reflecting layer on a substrate, the method comprising the steps of: implanting any one of N, O and C ions into the substrate when forming the recording layer or the dielectric layer to react with any one of the recording layer or the dielectric layer; and forming an interface layer on the recording layer or the dielectric layer.

In another embodiment of the present invention, the recording layer is composed of any one material selected among a GeSb—$Sb_2Te_3$ based material, a material in which one of Ag, Se, In and Co is added to the GeSb—$Sb_2Te_3$ based material at about 10 at % (atomic percent) or below, and an Ag—In—Sb—Te based material. The dielectric layer is composed of any one material selected among ZnS—$SiO_2$, $SiO_2$, $(Zr_xCe_{1-x})O_{1-y}$, AlN, and $Al_2O_3$. Further, the interface layer is formed by reactive sputtering.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the present invention, it is intended that an interface layer is formed on both lower and upper surfaces of a recording layer or one of them by either reactive sputtering based on a reactive gas such as $N_2$, $O_2$ and $CO_2$, or by co-sputtering based on Si, SiC, $SiO_2$, Au, Ag, Cu, Ni, Al, ZnS and the like, so that the complete erasure time of the recording layer can be reduced to increase recording sensitivity and reduce overwrite jitter. The interface layer resulting from reacting the recording layer or the dielectric layer with N, O, or C ions is formed.

First Embodiment

Figure 1:
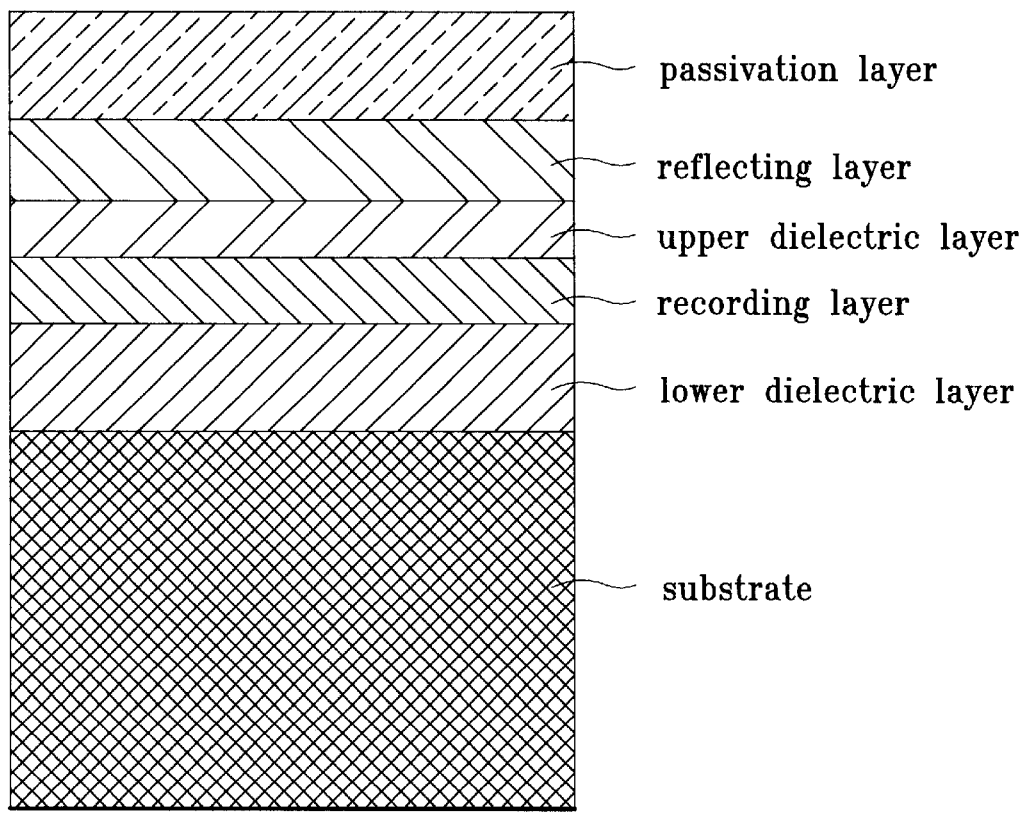
FIG. 1 is a sectional view illustrating a related art optical disk.
Figure 2:
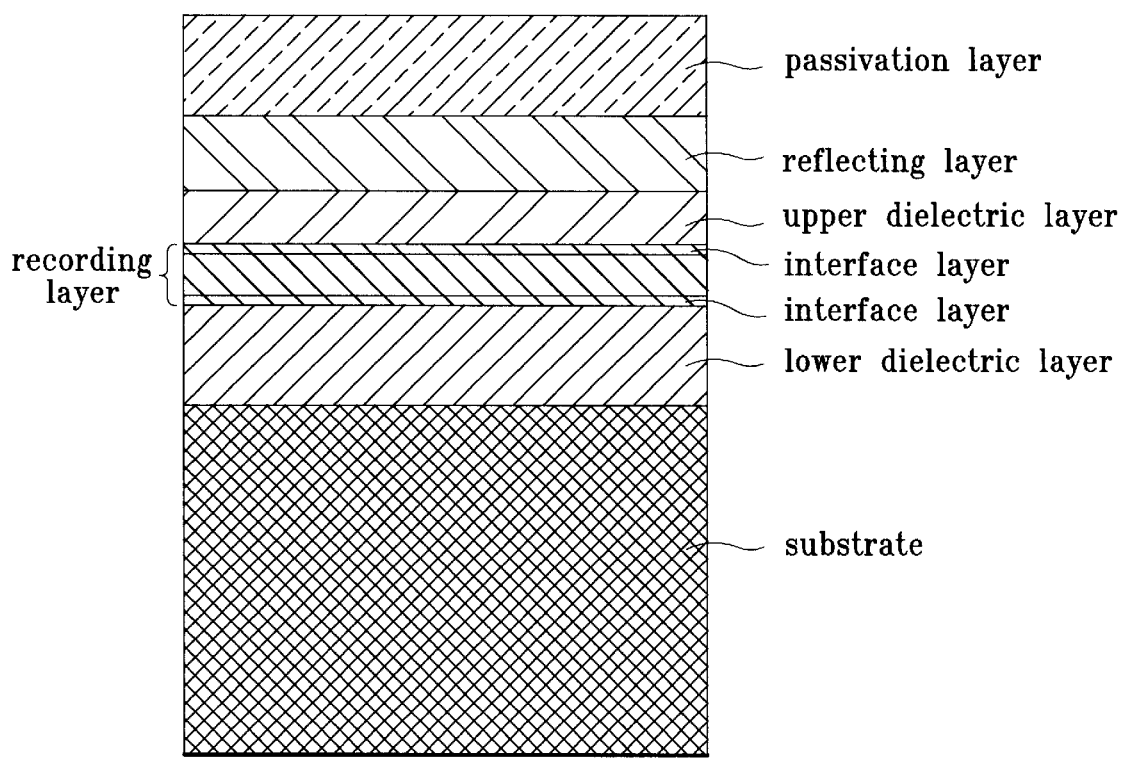
FIG. 2 is a sectional view illustrating an optical disk according to the first embodiment of the present invention.

FIG. 2 is a sectional view showing an optical disk in accordance with the first embodiment of the present invention. As shown in FIG. 2, a lower dielectric layer, a recording layer, an upper dielectric layer, a reflecting layer, and a passivation layer (UV curing resin) are sequentially formed on a polycarbonate substrate having a thickness of 0.6 mm or 1.2 mm. At this time, the dielectric layer is mainly composed of ZnS—$SiO_2$. Alternatively, the dielectric layer may be composed of $SiO_2$, $(Zr_xCe_{1-x})O_{1-y}$, AlN, or $Al_2O_3$.

The recording layer is composed of a GeSb—$Sb_2Te_3$ based material, a material in which Ag, Se, In, Co or the like is added to the GeSb—$Sb_2Te_3$ based material at about 10 at % (atomic percent) or below, or an Ag—In—Sb—Te based material. An interface layer is grown on either both lower and upper surfaces of the recording layer or one of them at thickness of about 5 mn or below by implanting a reactive gas such as $N_2$, $O_2$ and $CO_2$ into the surfaces of the recording layer by reactive sputtering or the like.

The interface layer(s) may also be formed by co-sputtering instead of reactive sputtering. That is to say, the interface layer(s) may be formed by co-sputtering any one of a GeSb—$Sb_2Te_3$ based material, a material in which one of Ag, Se, In and Co is added to the GeSb—$Sb_2$—$Sb_2Te_3$ based on material at about 10 at % (atomic percent) or below, and an Ag—In—Sb—Te based material, as a first target, and any one of Si, SiC, $SiO_2$, Au, Ag, Cu, Ni, Al and ZnS as a second target.

The interface layer(s) acts to reduce complete erasure time of the recording layer so that the recording sensitivity can be increased and the overwrite jitter can be reduced.

Meanwhile, the reflecting layer is composed of either an Al alloy or Au. Cr and Ti are added to the Al alloy within 5 mol. %.

A method for fabricating the aforementioned optical disk will be described below according to the present invention.

The lower dielectric layer, the recording layer, the upper dielectric layer and the reflecting layer are sequentially grown on the polycarbonate substrate of 0.6 mm or 1.2 mm at a predetermined pressure and power by making an inert gas ion including Ar incident upon a ZnS—$SiO_2$ target, a GeSb—$Sb_2Te_3$ target, and an Al alloy target by DC or RF magnetron sputtering.

Particularly, in case of the recording layer of the GeSb—$Sb_2Te_3$ based material, at an initial stage or the last stage of growing the recording layer, the reactive gas such as $N_2$, $O_2$ and $CO_2$ is implanted into the recording layer by reactive sputtering, so that the interface layer can be formed on either both lower and upper surfaces of the recording layer or one of them.

Alternatively, the interface layer may be formed by co-sputtering any one of Si, SiC, $SO_2$, Au, Ag, Cu, Ni, Al and ZnS on the GeSb—$Sb_2Te_3$ based target.

At this time, the dielectric layer of ZnS—$Si_2$ has a thickness of about 50~300 nm, the recording layer of GeSb—$Sb_2Te_3$ has a thickness of about 10~30 nm, the interface layer of the recording layer has a thickness of about 5 nm or below, and the reflecting of Al alloy has a thickness of about 100~300 nm.

Finally, the passivation layer is formed by depositing UV curing resin on the reflecting layer.

Second Embodiment

Figure 3:
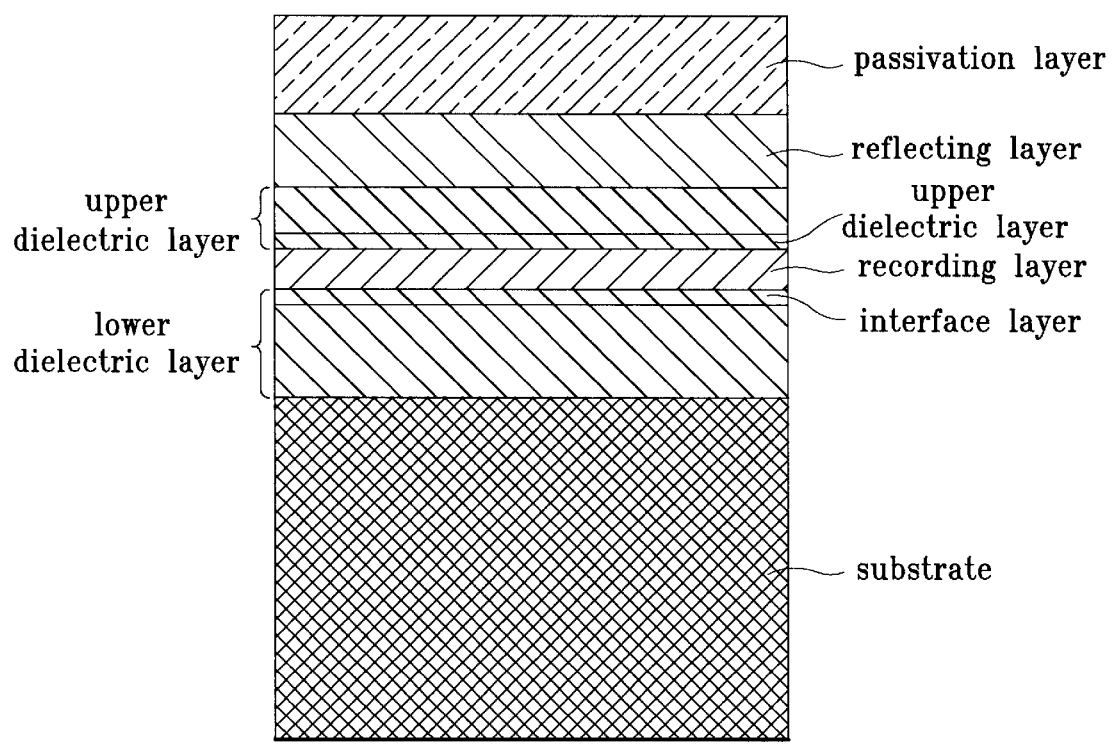
FIG. 3 is a sectional view illustrating an optical disk according to the second embodiment of the present invention.

FIG. 3 is a sectional view showing an optical disk in accordance with the second embodiment of the present invention. The optical disk according to the second embodiment of the present invention is almost identical to that according to the first embodiment except that an interface layer is formed either on a lower dielectric layer or below an upper dielectric layer at a thickness of about 10 nm. At this time, the lower and upper dielectric layers are in contact with the recording layer.

In other words, in the first embodiment, the interface layer is formed within lower and upper surfaces of the recording layer. However, in the second embodiment, the interface layer is formed within surfaces of the lower and upper dielectric layers adjacent to the recording layer.

A method for forming the interface layer on and below the dielectric layers can be accomplished by reactive sputtering or co-sputtering in the same manner as the first embodiment.

That is to say, the interface layer can be formed by implanting the reactive gas such as $N_2$, $O_2$ and $CO_2$ into the dielectric layers by reactive sputtering. At this time, the reactive gas is implanted into the lower dielectric layer at the initial stage of growing the lower dielectric layer, but is implanted into the upper dielectric layer at the last stage of growing the upper dielectric layer. Alternatively, the interface layer may be formed by co-sputtering any one of Si, SiC, $SiO_2$, Au, Ag, Cu, Ni, Al and ZnS on a target such as ZnS—$SiO_2$, $SiO_2$, $(Zr_xCe_{1-x})_yO_{1-y}$, AlN, and $Al_2O_3$.

As aforementioned, the optical recording medium and the method for fabricating the same have the following advantages.

Figure 4:
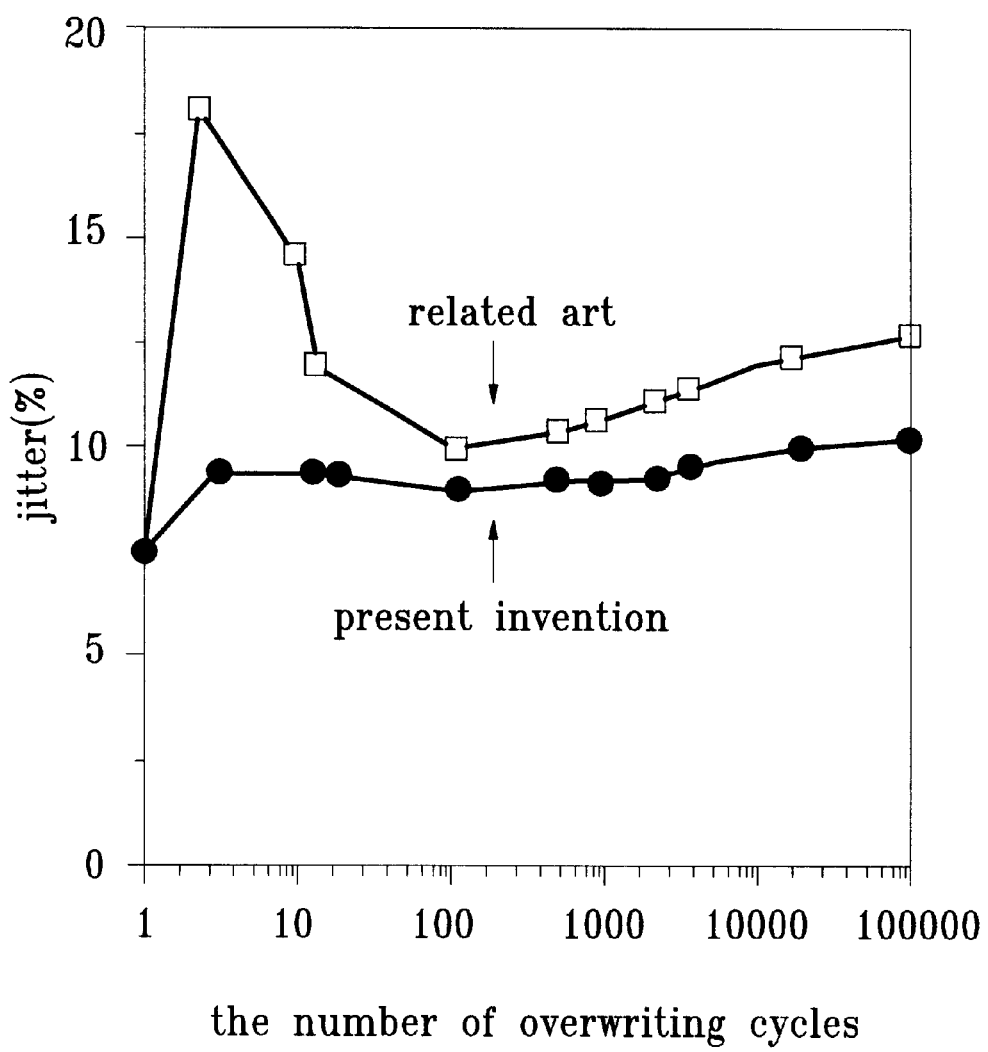
FIG. 4 is a graph showing jitter values of the related art and the present invention, respectively, in accordance with the number of overwriting cycles.

As shown in FIG. 4, the jitter bump is sufficiently suppressed by adding the interface layer between the recording layer and the dielectric layer. The interface layer accelerates the crystallization rate of the recording layer. No significant influence on optical properties (no reflectivity change) of the disk is observed in spite of the additional interface layer(s). Also, good adhesion with the recording layer is expected because there is no difference in the thermal expansion coefficient between the interface layer and the recording layer.

It will be apparent to those skilled in the art that various modifications and variations can be made in the optical recording medium and the method for fabricating the same according to the present invention without departing from the spirit or scope of the invention. Thus, it is intended that the present invention covers the modifications and variations of the invention provided they come within the scope of the appended claims and their equivalents.

What is claimed is:

1. An optical recording medium comprising:

at least one dielectric layer, at least one recording layer and a reflecting layer on a substrate; and an interface layer formed on either at least one of lower and upper surfaces of the recording layer or one surface of the lower and upper surfaces of the dielectric layer adjacent to the recording layer, at a predetermined thickness, wherein the recording layer is composed of a material in which one of Ag, Se, In and Co is added to a GeSb—$Sb_2Te_3$ based material at or below about 10 at % (atomic percent).

2. A method for fabricating an optical recording medium including at least one dielectric layer, at least one recording layer, and a reflecting layer on a substrate, the method comprising the steps of:

implanting any one of N, O and C ions into the substrate when forming the recording layer or the dielectric layer to react with any one of the recording layer or the dielectric layer; and forming an interface layer on the recording layer or the dielectric layer, wherein the recording layer is composed of a material in which one of Ag, Se, In and Co is added to a GeSb—$Sb_2Te_3$ based material at or below about 10 at % (atomic percent).

* * * * *